H. L. RICE.
RESILIENT WHEEL.
APPLICATION FILED OCT. 23, 1911.
1,047,705.
Patented Dec. 17, 1912.
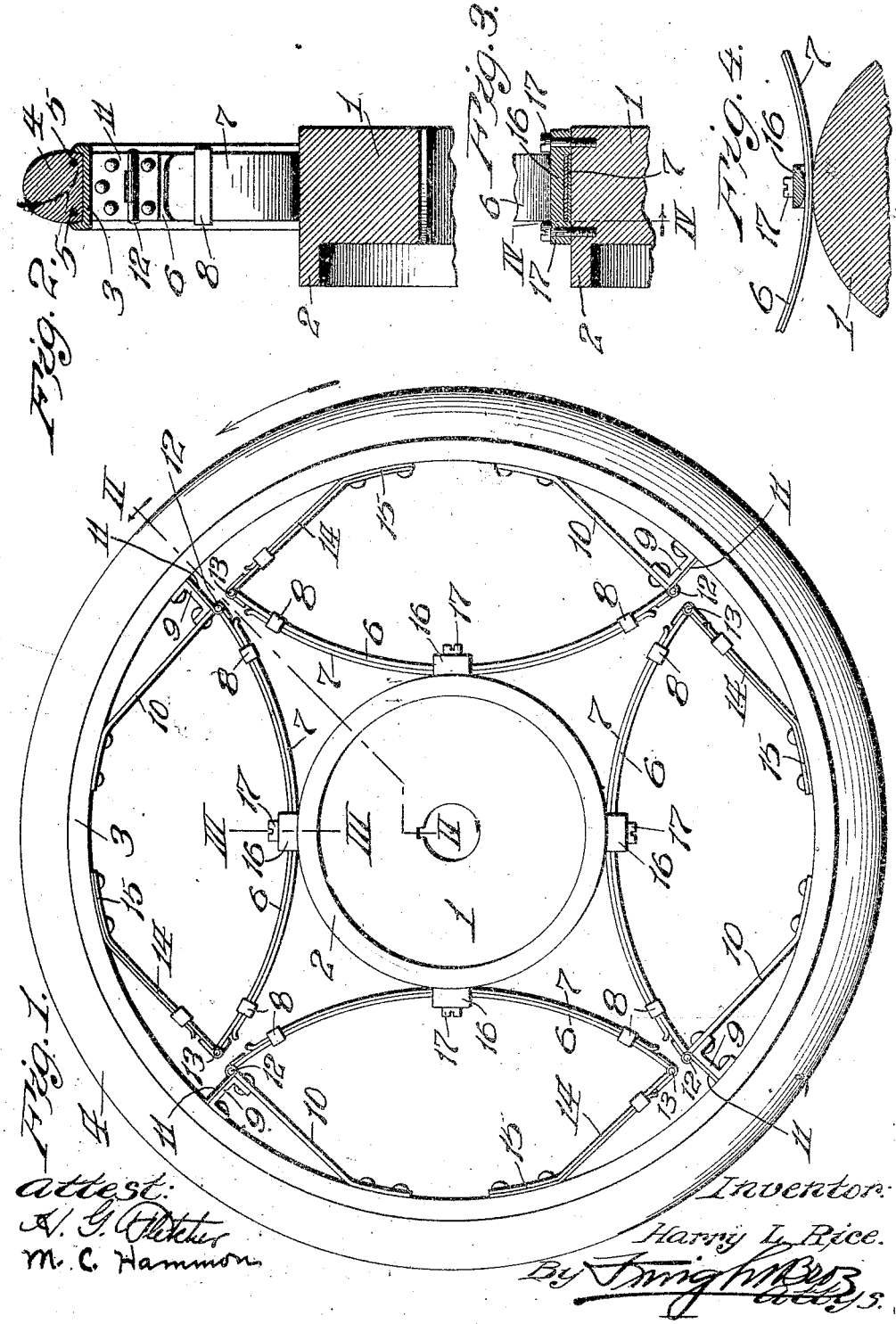
Inventor
Harry L. Rice.

UNITED STATES PATENT OFFICE.

HARRY L. RICE, OF CHILHOWEE, MISSOURI.

RESILIENT WHEEL.

1,047,705.   Specification of Letters Patent.   Patented Dec. 17, 1912.

Application filed October 23, 1911. Serial No. 656,246.

*To all whom it may concern:*

Be it known that I, HARRY L. RICE, a citizen of the United States of America, residing at Chilhowee, in the county of Johnson and State of Missouri, have invented certain new and useful Improvements in Resilient Wheels, of which the following is a specification.

This invention relates to resilient wheels, and has for its primary object to provide an improved construction, combination, and arrangement of parts in devices of this character whereby they may be simply and economically constructed and rendered durable and efficient in service.

One of the objects of the present invention is to provide an improved resilient mount for the hub by means of which said hub shall receive a resilient support from all portions of the rim of the wheel at the same time in whatever position the wheel may be. Toward the attainment of this object my invention contemplates the provision of bowed resilient members which are supported at each end from the felly of the wheel, and which are slidably secured to said hub in such manner as to cushion the hub from below, and to resiliently suspend said hub from above from the felly during the rotation of the wheel.

Another object is to provide improved means whereby said bowed supports can be rigidly supported at one end to adapt the wheel for propelling a self-moving vehicle, and resiliently supported at the other end to secure an increased resiliency in the mount.

Other and further objects will appear in the specification and be specifically pointed out in the appended claims, reference being had to the accompanying drawings exemplifying the invention, and in which, Figure 1 is a side elevation of a wheel constructed in accordance with the principles of this invention. Fig. 2 is a radial fragmentary section on the line II—II, Fig. 1. Fig. 3 is an enlarged fragmentary section on the line III—III, Fig. 1. Fig. 4 is a fragmentary section on the line IV—IV, Fig 3.

Referring more particularly to the drawings, and to the embodiment of my invention shown therein, a driving hub 1 is provided with an annular flange 2 suitable for the application of braking means to the internal and external surfaces thereof. In the present adaptation of my invention, I preferably employ a channel shaped rim or felly 3, within which is seated a solid rubber tire 4 which is held in position by the usual binding wires 5.

The hub 1 is resiliently supported from the felly 3 by means of the bowed members comprising a main leaf 6 and a reinforcing leaf 7, the ends of said leaves being secured together by means of bands 8. In order to provide means for rigidly mounting each of the bowed members from the felly of the wheel, I preferably employ a plurality of short channel shaped sections 9 which are secured at intervals to the rim or felly 3 in the manner shown in Fig. 1. A stiffening piece 10 is secured at one end to the inner flange of each channel section 9, its other end suitably bending to conform to the inner face of the rim 3 and being secured thereby by rivets.

A bearing plate 11 secured to the web on the channel 9 serves to position the pintle 12, whereby one end of the leaf 6 is hinged to the fixed support. The other end of the leaf 6 is hinged by the pintle 13 to the inner end of the leaf of the resilient support 14 which has its outer end 15 rigidly secured to the rim 3.

Referring now to Figs. 3 and 4, the slidable connection between each of the bowed resilient members and the hub 6 will be readily understood. Preferably, this connection is made by means of a grooved strap 16 which is secured by suitable fasteners, such as the bolts 17, to the hub 1. As shown in Fig. 4, the inner face of the strap 16 is rounded to adapt it to slidably engage the bowed support without undesirable interference.

The advantages to be derived from my improved wheel in action will now be readily understood, and briefly related are as follows, it of course being understood that while I have, for the sake of clearness in the drawing, employed only four bowed supports, any desired number may be employed.

Referring now more especially to Fig. 1, it will be seen that the hub rests directly upon the bowed center of the lowermost resilient member, being thereby cushioned from the lower portion of the rim 3. At the same time, the uppermost bowed member, by reason of its connection to the hub 1 by means of the bearing strap 16, serves to resiliently suspend the hub 1 from the upper edge of the rim. In addition, the hub 1 is afforded an efficient lateral support by the bowed members on either side. By multiplying the number of bowed members employed, it will be appreciated that the hub 1 will receive a resilient cushioning and suspension support from all points of the rim, and said supports will be operative continuously during the varying movements of the wheel. Let it be supposed now that power be applied to the hub 1 in any suitable manner to drive the wheel in the direction of the arrow shown in Fig. 1. It will be seen that the strap 16 will grip the bowed supports at the moments of starting and increasing the speed, so that the tangential effort will be transmitted directly to the fixed supports mounted on the inner base of the rim 3. At the same time the flexible connection on the other end of each bowed member, with the resilient support 14, will serve to impart the desired resiliency.

What I claim is:

1. In a resilient wheel, the combination with a rim, of a plurality of bowed springs, each of said springs having one end hinged to a part rigid with the rim, and its other end hinged to a part resiliently supported by the rim, and a hub resiliently engaging each of said springs intermediately of their ends; said hub being provided with bearings slidably engaging said springs.

2. In a resilient wheel, the combination with a rim, of a hub provided with a peripheral bearing surface, rigid supports mounted on the inner face of said rim, leaf springs spaced from said rigid supports, and bowed springs slidably engaging the peripheral bearing surface of said hub, and each having one end connected to a fixed support, and its other end connected to the free end of one of said leaf springs.

3. In a resilient wheel, the combination with a rim, of a hub, a plurality of leaf springs each being secured at one end to the inner wall of said rim and projecting inwardly in a direction normal to a radius of the wheel, and main leaf springs secured at one end to portions rigid with the rim and having their other ends connected respectively to the inner ends of the first said leaf springs, said main leaf springs being bowed inwardly toward the center of the wheel with the central portions thereof in slidable engagement with said hub.

HARRY L. RICE.

In the presence of—
 WM. SWEENEY,
 R. E. SWEENEY.